Dec. 16, 1952     S. M. BLITZER ET AL     2,622,093
RECOVERY OF TETRAALKYLLEAD COMPOUNDS
Filed May 23, 1951
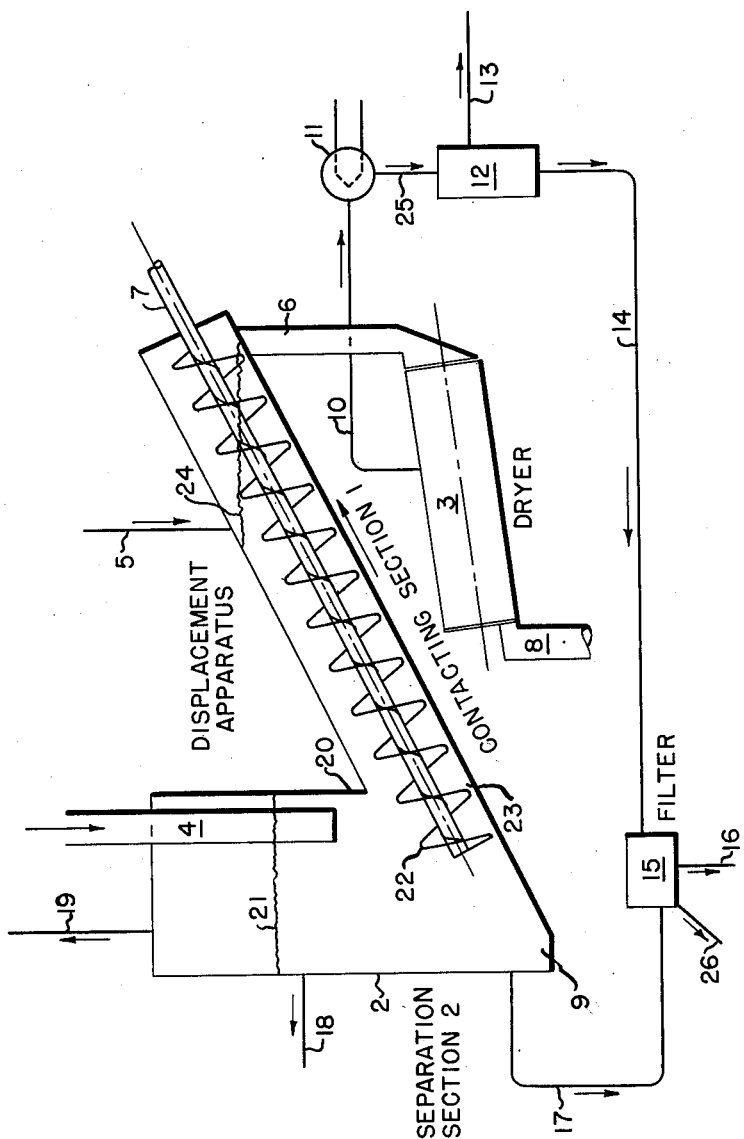
INVENTORS
SIDNEY MILTON BLITZER
ORLAND MORGAN BROWN
BY Kenneth Swartwood Patented Dec. 16, 1952

2,622,093

UNITED STATES PATENT OFFICE 2,622,093

RECOVERY OF TETRAALKYLLEAD COMPOUNDS

Sidney M. Blitzer and Orland M. Brown, Baton Rouge, La., assignors to Ethyl Corporation, New York, N. Y., a corporation of Delaware Application May 23, 1951, Serial No. 227,831

8 Claims. (Cl. 260—432)

This invention relates to the manufacture of tetraalkyllead compounds, and more particularly to the recovery and isolation of such materials from the mixture obtained in a producing reaction.

Tetralkyllead compounds, as, for example, tetramethyllead, tetraethyllead, tetra-n-propyllead, are customarily made by the reaction of a sodium-lead alloy and an alkylating agent. Thus, tetraethyllead is produced by the reaction of a sodium-lead alloy with an ethylating agent such as ethyl chloride, ethyl bromide, diethyl sulfate or the like. These reactants are normally used in such proportions that the material remaining upon completion of the reaction is a dry, granular material of grayish or black appearance. In the isolation of tetraethyllead from this material, which we term reaction mass, it has always heretofore been considered necessary to separate the tetraethyllead by a steam distillation. Such a steam distillation operation is carried out by immersing the reaction mass in water containing various additives whose function is to prevent the agglomeration of the solid residue particles during the distillation operation. The agglomeration referred to is not clearly understood, but evidently is a result of the complicated physico-chemical properties of the predominantly lead particles and the agitation of this system during the steam distillation operation. Such anti-agglomerants as are disclosed in United States Patents 2,513,654 and 2,513,659 to Krohn and Madden, respectively, are commonly used in this connection.

Although operable, the above described steam distillation is not fully satisfactory in all respect. Among the deficiencies of this prior method is the copious quantity of steam required for the operation. In particular, it has long been recognized that in the customary commercial procedure, the stripping effectiveness of the stream decreases rapidly during the progress of the normal batch or cyclic operation. As a result, during a large fraction of the steam distillation, an apperciable part of the steam fed is wasted. In addition, although the anti-agglomerants described have been responsible for alleviating to a large extent the agglomeration difficulty, nevertheless such agglomeration still occurs from time to time and imposes an overload on the agitation equipment and reduces the overall capacity of a process installation.

The object of our invention is to provide a new recovery process which obviates the necessity of steam distilling the tetralkyllead from the reaction mass as well as of using anti-agglomerants.

Another object is to provide a recovery process which is particularly suitable for the continuous recovery of such tetrallkyllead compounds. Additional objects are to provide a process which avoids extensive agitation, and which is highly efficient in the recovery of a tetralkyllead from reaction masses which can be characterized as dry solids, or which have a high solids content. Additional objects will appear from the detailed description and examples given hereinafter.

Our process for accomplishing the above and other objects comprises intimately contacting the reaction mass with water, whereby the tetraalkyllead is substituted by or displaced by the water from the solid components of the reaction mass. The so displaced tetralkyllead is then collected and withdrawn as a high purity product stream.

It has been found that water exerts a strong and effective displacement or substitutive action on the tetraalkyllead present in reaction mass. As a result of the contacting of reaction mass according to our process, the tetraalkyllead is removed and can be withdrawn as a separate liquid phase. In addition, we are able to segregate and remove the soluble components of a reaction mass from the insoluble, predominantly lead residue. By our process, a three phase system is produced, including not only the liquid tetraalkyllead, but also a water phase containing the soluble components, and an insoluble solid lead residue. In the preferred embodiments of our process, we provide for countercurrent contacting and the separate discharge of the tetraalkyllead, the water phase and the solids. Our process is not limited to the preferred embodiments, however, being of quite general application to the recovery of tetraalkyllead compounds as is explained hereafter. In addition to the principal benefits of our process, we have found that specific embodiments thereof can be operated in conjunction with supplementary operations to provide an efficient integrated process installation. Such specific embodiments and supplementary operations will be apparent to those skilled in the art, from the detailed description and examples given hereafter. The accompanying figure, being an illustration of apparatus for and flows in a continuous example of the process, facilitates the easy understanding of a preferred embodiment.

Our invention resides in the discovery that the tetraalkyllead content of a reaction product mixture can be removed or displaced and substituted by water, despite the extremely intimate distribution of the tetraalkyllead in the solid portions of a reaction product mixture. It has heretofore been believed that the relatively drastic action of a steam distillation was essential in effecting a removal of the desired product. According to our process, the essential step is the intimate contacting of water and the reaction product mixture. However, although water is the active component, we find that it is by no means essential that pure water alone be used. In fact, in virtually all embodiments of the process, soluble components of the reaction product mixture are concurrently dissolved in the water without detracting from the effectiveness with which thhe tetraalkyllead is substituted or displaced as a separate liquid phase. In addition, in many continuous embodiments of the process, it will be found convenient or advantageous to recycle the water continuously through the process. In such instances, a portion of the dissolved components should be removed from the aqueous stream before recycle in proportions comparable to the quantity dissolved from the reaction products.

The soluble salt components found in reaction product mixtures will, of course, vary according to the specific reaction employed for synthesizing the tetraalkyllead. Thus, when an alkyl halide is used in reacting with a sodium-lead alloy, the product mixture will contain the corresponding sodium halide, such as sodium chloride, sodium bromide or sodium iodide. Other soluble salts resultant from processes which utilize either a different alkylating agent or a different metal than sodium are sodium sulfate, magnesium bromide or magnesium iodide.

In carrying out our process to fullest advantage, we circulate sufficient water in excess of the amount required to provide for full solution of the soluble components of the reaction mass. By operating with such proportions, we assure that the viscosity of the water solution is kept at a suitably low level. A low viscosity solution, that is, with fluidity approaching that of water itself, is more easily intimately contacted with the reaction mass without strong agitation.

As an example of the relative proportions of water used in our process, in treating the reaction mass obtained from the reaction of monosodium-lead alloy and ethyl chloride, we prefer a net flow of water of from about 100 to 200 parts of water per 100 parts of the reaction mass. In embodiments wherein the water stream is recycled after removal of some of the dissolved salt, we use the above proportions as a guide to the preferred amount of solution to be recycled. Thus, in order to obtain the same effect as provided by 100 to 200 parts of water, we use from about 150 to 300 parts of a recycled water solution containing 10 to 15 percent by weight of sodium chloride.

It will be understood that holdup of water or water solution in any specific process installation may be greatly in excess of the net throughput rate. In other words, the residence time of the water solution in the process may be fairly extended.

In addition to the salts which dissolve in the water, various other materials are occasionally added. These may include organic materials in the nature of wetting agents such as soaps or other detergents. Another component frequently added to the water or water solution is a minor quantity of an acid or acid reacting compound. Such materials have been found to exert a beneficial action upon the properties of the residue solids. In particular, the solids discharged after contact with an acidic solution will be peculiarly susceptible to rapid and efficient drying before processing such solids for recovery of the metal values. Thus, although the use of an acid is not an essential feature, our process nevertheless provides an ideal means for so treating or modifying the properties of the solids prior to further treatment. Substantially all the common acids can be used in this connection, for example, hydrochloric acid, sulfuric acid and phosphoric acid, are suitable and economical. The common organic acids can also be fully adequately used, if desired. Thus acetic acid, formic acid, lactic acid, and butyric acid are typical examples of acid components which may be added to the water. In the use of an acid reacting material, the usual practice is to apportion sufficient acid to correspond to a slight excess over that required to neutralize the basic components present in the reaction mass. A large excess is avoided, inasmuch as a strong acid in contact with a tetraalkyllead tends to react with and degrade the product.

The effectiveness of our process is illustrated by the following examples of the recovery of tetraethyllead.

Example I

Tetraethyllead was prepared from monosodium-lead alloy and ethyl chloride by reacting at a temperature of about 85° C. The alloy and ethyl chloride were used in the proportions of about two parts by weight of alloy to one part of ethyl chloride, providing approximately 70 percent excess ethyl chloride. Upon completion of the reaction, the pressure on the mixture was released with an accompanying vaporization of most of the unreacted excess ethyl chloride and gaseous by-products of the reaction.

The reaction mass resultant from this preparation was a dry, granular material, having the following composition:

| | Weight percent |
|---|---|
| Tetraethyllead | 24 |
| Lead | 56 |
| Sodium chloride | 19 |
| Sodium | 0.5 |
| Ethyl chloride | Trace |

A portion of this reaction mass amounting to 250 parts by weight was placed on a filtration septum. A stream of water at room temperature was passed through this deposit with the aid of a vacuum. The water contained a trace of dissolved ferric chloride. After 2000 parts of water had been passed through the material, the operation was discontinued. The reaction mass residue was extracted with a substantial quantity of benzene to dissolve only undisplaced tetraethyllead, and the quantity thereof determined by treating of an aliquot portion of the resultant solution with an iodine reagent, followed by back titration of the excess iodine. The analysis showed 24 parts of tetraethyllead in the benzene solution, showing that 60 percent of the tetraethyllead had been displaced by the water.

Example II

The same procedure as used in Example I was followed, with the exception that 6000 parts of pure water were used and contacted with the reaction mass. A 74 percent recovery of available tetraethyllead was obtained.

Example III

The same procedure as in the preceding examples was used, except that 6000 parts of water maintained at a temperature of approximately 100° C. were used as the displacing material. A recovery of over 81 percent of the tetraethyllead available was realized.

The foregoing examples illustrate the good results obtained by a simple embodiment of our process. In addition, it will be noted that an increase in temperature, other conditions being unchanged, provides an improvement in recovery over operation at moderate or room temperatures. It will be seen from these examples that our process affords a surprisingly simple and efficient means for the recovery of a tetraalkyllead. The advantages of the process are evident when it is realized that in a conventional steam distillation, a steam distillation period of at least one hour is required. In contrast, our process requires no steam and requires a processing time of the order of only five to fifteen minutes.

Although the examples above given show that conventional anti-agglomerant additives in the water are not required, the use of such materials is not harmful to the process and, in fact, may be of benefit in subsequent supplementary operations. Certain surface active materials have been found to be of benefit in the recovery as practiced by our method, but it has also been found that a much more important factor is the temperature of the water phase and the efficiency of contact with reaction mass.

As mentioned heretofore, a specific object of our invention is to provide a process particularly susceptible to continuous operation. As is well known, a continuous operation generally affords substantial economies over batch procedures. The continuous embodiments of our process may involve cocurrent flows as well as countercurrent flows, the latter being preferred. It will be readily understood that the precise apparatus employed for our process may take innumerable forms consistent with accepted design. An example of a preferred and highly efficient apparatus is illustrated by the accompanying figure, the figure being a schematic diagram showing recovery apparatus for a countercurrent and continuous embodiment of the process, plus certain supplementary apparatus for auxiliary steps suitably carried out in conjunction with our process.

Referring to the figure, the apparatus consists of two integrated and connecting chambers designated as a contacting section 1 and a separation section 2. Supplementary apparatus includes a dryer 3 and a filter 15.

A feed pipe or conduit 4 provides means for introducing a reaction mass to the separation section 2, the feed pipe being positioned to discharge below a level 21 at which the water phase is maintained. In addition, the feed pipe 4 is laterally placed to feed the reaction mass directly above the first several flights of a screw conveyer 22.

The contacting section 1 is an inclined chamber of U-shaped cross section. A screw conveyer 22 is mounted therein, the center line thereof corresponding to the center of the semi-circular bottom contour of the contacting section 1. The bottom of the separation section 2 is a continuation of the bottom contour of the contacting section 1. The flights of the screw conveyer 22 have a slightly smaller radius than this bottom shell contour, thereby providing a slight free space 23. This free space is beneficial in several respects, first in allowing relatively unobstructed flow of liquid tetraalkyllead displaced from the reaction mass solids, and secondly, it has been found that such a clearance minimizes any tendency of the lead containing particles to cold work into sheets or masses which bind the action of the conveyer 22.

A line 5 into the contacting section 1 provides the inlet for the water, or if desired, for a recycled water solution. A discharge chute 6 leading from the upper end of the contacting section 1 provides a channel for flow of the treated reaction mass solids from the displacement apparatus. As such solids will be wet with the water phase, a dryer 3 is suitably used for evaporating the liquid and also any residual tetraalkyllead remaining in the solids. A discharge chute 8 from the dryer 3 conducts the dried solids to subsequent operations, such as smelting, for recovery of the lead content thereof.

A condenser 11 liquefies the vapor from the dryer, the separatory drum 12 then separately discharging the aqueous condensate in line 13 and the tetraalkyllead in line 14.

The tetraalkyllead displaced in contacting section 1 is collected by gravity flow as a separate liquid pool 9 in the separation section 2, surmounted by a body 20 of the water solution. Discharge lines 17 and 18 provide for separate draw-off of the tetraalkyllead and the aqueous phases, respectively. A filter 15 receives the tetraalkyllead from the recovery apparatus through line 17, as well as minor amounts from the dryer through line 14. The filter serves to remove any residual or entrained solids in the liquid tetraethyllead and insures the purity of the final product discharged through line 16. Line 26 provides for discharge of the minute amounts of solid impurities removed by the filter 15.

To further illustrate our process, the following example describes an embodiment of our process applied to the recovery of tetraethyllead in apparatus as above described. Unless otherwise specified all concentrations and flows are expressed in parts by weight.

*Example IV*

We prepare a reaction mass containing tetraethyllead in the following manner. A comminuted alloy of sodium and lead containing 10 percent sodium is reacted with ethyl chloride in the proportions of 500 parts of ethyl chloride to 1000 parts of the alloy. At the conclusion of the reaction, unreacted ethyl chloride is flashed off, leaving a dry, granulated reaction mass. A typical composition of such a reaction mass is as follows:

| | Weight percent |
|---|---|
| Tetraethyllead | 24 |
| Lead | 56 |
| Sodium chloride | 19 |
| Sodium | 0.5 |
| Ethyl chloride | Trace |

The reaction mass is fed at a regular rate through feed pipe 4 to the separation section 2 of the recovery apparatus. Concurrently, a supply of a water solution containing 10 weight percent sodium chloride is fed through line 5 to the contacting section 1. The solution is fed at the rate of about 200 parts per 100 parts of reaction mass.

The reaction mass falls into the operating zone of the screw conveyer 22; that is, the portion of the screw conveyer operating within the confines of the separation section 2. In passing into contact with the aqueous liquid, the small amount of ethyl chloride present in the reaction mass is vaporized and collects above the liquid level 21. A vent line 19 discharges this ethyl chloride from the separation section.

The screw conveyor 22 transports the reaction mass solids upwardly in the contacting section. In such movement, the solids are intimately contacted with the aqueous liquid, which is passed countercurrently to the movement of the solids. The tetraethyllead is thereby displaced as a separate liquid phase, the usual degree of recovery being 80 percent or more of the tetraethyllead originally present. The liquid tetraethyllead drains downwardly in the contacting section and collects as a pool 9 at the lowermost portion of the separation section 2. The tetraethyllead is continuously removed through line 17 and passed to a filter 15.

The aqueous solution is discharged through line 18 as a solution containing approximately 13 percent sodium chloride, the rate of discharge being about 170 parts per 100 parts of reaction mass fed. The displacement liquid level 21 in the separation section is maintained at a slightly lower position than the liquid level 24 in the contacting section 1.

Concurrently with discharge of the aqueous liquid through line 18 and liquid tetraethyllead through line 17, a wet slurry is discharged at the upper end of the contacting section 1 through line 6. This slurry includes a portion of the aqueous solution, plus the residue solids resultant from the treated reaction mass. About 110 parts of such a slurry will be discharged per 100 parts of reaction mass fed, the usual composition being approximately 50 percent lead, 3 or 4 percent tetraethyllead, 5 or 6 percent salt, and about 40 percent water. As the slurry will contain a small amount of recoverable tetraethyllead, a desirable supplementary operation is the vaporization of the volatile components in the rotary dryer 3. Such components include the water and tetraethyllead, which are discharged as a vapor through line 10, and condensed in heat exchanger 11. The condensate is then passed to the separatory drum 12, wherein the immiscible tetraethyllead layer is discharged through line 14 to the filter 15. A minor quantity of tetraethyllead is recovered in this manner, and will amount to about 2 to 4 parts of tetraethyllead per 100 parts of reaction mass fed to the displacement apparatus. By this means, an overall recovery of the order of 99 percent may be achieved.

In the above described embodiment and in other embodiments of the process, the proportions of materials used and the conditions of operation can be varied through substantial ranges and good results will be obtained. The proportions of aqueous liquid will be varied somewhat according to individual characteristics and compositions of the reaction mass. In virtually all instances, however, the net flow of the aqueous liquid will preferably correspond to from about 100 to 200 parts of water per 100 parts of the reaction mass processed. This preferred range is a useful guide in embodiments wherein a portion of the discharged displacing liquid is freed of dissolved material, and is then recycled. For example, when sodium chloride is the principal component dissolved in the aqueous liquid, it can be evaporated to precipitate a portion of such salt which can be used for other purposes. It is not essential, however, to completely remove the dissolved salt. Thus, it will be found convenient to remove sufficient salt to leave in solution a quantity corresponding to a 10 percent by weight concentration. In general, it is preferred that the aqueous liquid fed should not contain more than about 15 percent salt. In feeding a 10 percent salt brine solution to the displacing apparatus, from 150 to 300 parts will be fed to provide action equivalent to 100 to 200 parts of water. It should be understood that the holdup of aqueous liquid in any specific embodiment may be greatly in excess of the net throughput rate.

The temperature of operation of the process is not highly critical, although it does exert a definite effect on the degree of recovery. Thus, operation at room temperature provides a highly efficient displacement of the tetraethyllead, as shown by the preceding examples. For best results, however, we prefer to operate at moderately elevated temperatures, the preferred range being with the displacing liquid preheated to from 75° C. to 150° C. At temperatures above 100° C., appropriate provision must necessarily be made in the design of the apparatus to provide for the moderate pressure retention necessary to prevent excessive vaporization of the aqueous phase. In operating at an elevated temperature, a supply of heat to the operation will necessarily be provided. This is conveniently done by preheating the aqueous liquid, or by a heating medium in a jacket surrounding the contacting section.

Our process does not preclude the addition of various chemicals to the aqueous phase to achieve a desirable effect. In particular, it has been found that the addition of a small quantity of an acidic material to the aqueous liquid is of benefit in subsequent treatment of the reaction mass residue solids. Thus, in processing the reaction mass of a monosodium-lead alloy-ethyl chloride reaction according to the detailed embodiment above described, it is advantageous to acidify the aqueous liquid to the extent of a concentration equivalent to 0.3 to 0.7 percent hydrogen chloride. Such acidifying treatment is particularly advantageous in that it facilitates the drying of the reaction mass residue.

It will be understood that our process can be used to great advantage in many embodiments differing from the embodiment described above. In addition, the process is not limited by the apparatus employed, the apparatus described in the foregoing description being purely illustrative. Our process is, in addition, not limited to the recovery of tetraalkyllead from the reaction mass resultant from any one specific chemical process. Numerous processes are known to the art which result in reaction masses of the general type for which our process is intended, that is, the reaction mass is characterized by either being dry comminuted solids, or a heavy, stiff slurry or mud. As examples of processes of this character can be mentioned the processes disclosed in Calingaert and Shapiro Patents 2,535,190; 2,535,191; 2,535,192; 2,535,193; 2,535,235; 2,535,236; and 2,535,237; in Sullivan et al. Patent 1,611,695, and in Pearsall Patent 2,414,058. The process is, however, especially suited for and will be most commonly used in the recovery of tetraethyllead from the reaction mass resulting from the reaction of monosodium-lead alloy and ethyl chloride.

We have shown by the foregoing examples and description of a preferred embodiment, the manner of working our process, and how the objects of our invention are attained. As many variations thereof will be apparent to those skilled in the art, we do not intend to limit our invention other than by the following claims.

We claim:

1. Process for the recovery of a tetraalkyllead from a dry reaction mass having therein appreciable tetraalkyllead not discernible as a separate phase, comprising intimately contacting the reaction mass with water for a sufficient time to substitute the water for the tetraalkyllead and form a separate liquid phase of the tetraalkyllead, and withdrawing the so-formed liquid tetraalkyllead.

2. Process for the recovery of a tetraalkyllead from a dry reaction mass having therein appreciable tetraalkyllead not discernible as a separate phase, comprising intimately contacting the reaction mass with water at a temperature of from about 75° C. to about 150° C. for a sufficient time to substitute the water for the tetraalkyllead, and form a separate liquid phase of the tetraalkyllead and withdrawing the so-formed liquid tetraalkyllead.

3. A process for the recovery of tetraethyllead from a dry reaction mass having therein appreciable tetraethyllead not discernible as a separate phase, comprising intimately contacting the reaction mass with water at a temperature of from about 75° C. to about 150° C. for a sufficient time to substitute the water for the tetraethyllead and form a separate liquid phase of the tetraethyllead and collecting and withdrawing the so-formed liquid tetraethyllead.

4. A continuous process for the recovery of tetraethyllead from a dry reaction mass having therein appreciable tetraethyllead not discernible as a separate phase, comprising intimately countercurrently contacting the reaction mass with water and thereby substituting the water for the tetraethyllead and collecting and withdrawing the so-formed liquid tetraethyllead.

5. A continuous process for the recovery of tetraethyllead from a dry reaction mass resultant from the reaction of monosodium-lead alloy and ethyl chloride comprising countercurrently contacting the reaction mass in an extended contacting zone with water, and thereby substituting the water for the tetraethyllead, and dissolving sodium chloride in the water, withdrawing from one end of the contacting zone a mixture of the residue solids and some of the so-formed water solution of sodium chloride, and separately withdrawing at the opposite end of the contacting zone the liquid tetraethyllead and the rest of the water solution.

6. The process of claim 5 further defined in that the water is maintained at a temperature of about 75° C. to about 150° C.

7. A continuous process for the recovery of tetraethyllead from a dry reaction mass resultant from the reaction of monosodium-lead alloy and ethyl chloride comprising countercurrently contacting the reaction mass in an extended contacting zone with an aqueous acidic salt solution, whereby the tetraalkyllead is displaced as a separate liquid phase by the aqueous solution, the aqueous solution initially having an acidity equivalent to about 0.3 to 0.7 weight percent hydrogen chloride and a salt content of less than 15 weight percent, and being contacted with the reaction mass in the proportions of from about 150 to 300 parts by weight to 100 parts of the reaction mass; withdrawing from one end of the contacting zone a predominantly solids residue comprising the undissolved reaction solids, and at least 50 parts of the aqueous solution, and separately withdrawing at the opposite end of the contacting zone the liquid tetraethyllead and the rest of the aqueous solution.

8. A continuous process for the recovery of a tetraalkyllead from a dry reaction mass having therein tightly bound tetraalkyllead not discernible as a separate phase, comprising supporting the reaction mass on a liquid conveying surface, passing water over said reaction mass and displacing thereby the tetraalkyllead as a continuous liquid phase which flows from the reaction mass.

SIDNEY M. BLITZER.
ORLAND M. BROWN.

REFERENCES CITED

The following references are of record in the file of this patent:

UNITED STATES PATENTS

| Number | Name | Date |
| --- | --- | --- |
| 1,949,949 | Alleman | Mar. 6, 1934 |
| 1,975,171 | Parmelee | Oct. 2, 1934 |
| 2,038,704 | Bake et al. | Apr. 28, 1936 |
| 2,310,806 | Nourse | Feb. 9, 1943 |